(12) United States Patent　　(10) Patent No.:　　US 6,351,081 B1
Hwang　　(45) Date of Patent:　　Feb. 26, 2002

(54) ELECTRONIC BALLAST FOR HIGH INTENSITY DISCHARGE LAMP

(76) Inventor: Gapwoo Hwang, 1190, Naesam-Ri, Juchon-Myon, Kimhae-Si, Gyeongnam, 621-840 (KR)

( * ) Notice: Subject to any disclaimer, the term of this patent is extended or adjusted under 35 U.S.C. 154(b) by 0 days.

(21) Appl. No.: 09/646,084

(22) PCT Filed: Mar. 27, 1998

(86) PCT No.: PCT/KR98/00065

§ 371 Date: Sep. 13, 2000

§ 102(e) Date: Sep. 13, 2000

(87) PCT Pub. No.: WO99/51066

PCT Pub. Date: Oct. 7, 1999

(51) Int. Cl.[7] .............................................. H05B 37/02
(52) U.S. Cl. ....................... 315/224; 315/307; 315/247; 315/DIG. 7; 315/119
(58) Field of Search ................................. 315/224, 225, 315/247, 307, DIG. 7, 291, 209 R, 219, 119

(56) References Cited

U.S. PATENT DOCUMENTS

| | | | | |
|---|---|---|---|---|
| 5,751,115 A | * | 5/1998 | Jayaraman et al. | ......... 315/225 |
| 5,798,615 A | * | 8/1998 | Gasparini et al. | ........... 315/219 |
| 5,811,941 A | * | 9/1998 | Barton | ........................ 315/307 |
| 5,900,701 A | * | 5/1999 | Guhilot et al. | .............. 315/307 |
| 6,034,485 A | * | 3/2000 | Parra | ..................... 315/209 R |
| 6,188,553 B1 | * | 2/2001 | Moisin | ........................ 361/52 |

* cited by examiner

Primary Examiner—David Vu
Assistant Examiner—Ephrem Alemu
(74) Attorney, Agent, or Firm—Notaro & Michalos P.C.

(57) ABSTRACT

Disclosed is an electronic ballast for a high intensity discharge lamp which is capable of reducing the number of parts to thereby maintain a high power factor and prevent power loss generated in the circuit thereof. The electronic ballast includes: a converter part having first to fourth rectifying diodes, a choke coil and a first condenser; an inverter part having first and second switching transistors, a second condenser, a DIAC, and first and second gate wave shaping integrated circuits; an output matching part having a resonant coil, first to third resonant condensers, and a transformer; an absorbed DC power source part having first and second diodes and third and fourth condensers; a power control part having a first operational amplifier, first and second DC voltage detection resistors, a first resistor, a second operational amplifier, a second resistor, a third resistor, a first comparator, a fourth resistor, a second comparator, a fifth resistor, a first switch, a third comparator, a timer, a sixth resistor, a fifth condenser and an undervoltage lockout; and a gate transformer.

1 Claim, 1 Drawing Sheet

ELECTRONIC BALLAST FOR HIGH INTENSITY DISCHARGE LAMP

FIELD OF THE INVENTION

The present invention relates to an electronic ballast for a high intensity discharge lamp.

BACKGROUND OF THE INVENTION

Generally, there have been presented various types of arc tube lamps such as, for example, a fluorescent lamp commonly used in general houses, a lighting lamp used in factories, a street lamp installed on the street and so on. In this case, the fluorescent lamp, an ultraviolet rays lamp and a low pressure sodium vapor lamp are contained within low pressure discharge lamps, and the street lamp is included within high pressure discharge lamps. Referring to features of the low pressure discharge lamp, it has a long length of tube, so that the heat generated within the tube is discharged to the outside to thereby allow tube atmosphere to be same before or after the lamp is lighted. Therefore, the low pressure discharge lamp has a constant tube voltage at the time when the lighting of the lamp is initialized and after it is completed, so that it can easily adapt an electronic ballast without any problem. On the other hand, examples of the high pressure discharge lamp are a mercury lamp, a high pressure sodium vapor lamp, a metal halide lamp and the like, which are generally called a high intensity discharge (HID) lamp. Referring now to the features of the high intensity discharge lamp, it has a relative short length of tube but a high power. If the high intensity discharge lamp is lighted, the interior of the tube becomes at a substantially high temperature of plasma state, which causes air atmosphere within the tube to be tremendously high when compared with the time before the lamp is lighted. In the case where a constant amount of tube current is applied, the tube voltage upon the lighting of the lamp is much different from that after the lighting of the lamp is completed. In addition, even when the lamp is stabilized and operated, under the effect of a negative resistance impedance in the lamp, an impedance is high over the tube voltage and contrarily, it is low below the tube voltage. To light such the high intensity discharge lamp, a prior art leakage transformer type ballast has been generally employed. The leakage transformer functions as a current source and has a function of limiting an amount of the current regardless of the impedance of lamp. As a result, when the lamp is initially lighted the tube voltage approaches a potential of zero voltage, and when the lighting of lamp is stabilized, it is changed to a normal potential. To high the inductance of the leakage transformer, however, a long coil for winding the transformer is required, which renders the efficiency of the leakage transformer really deteriorated.

To solve the disadvantage of the leakage transformer, an electronic ballast using an electronic control method is newly employed. Owing to the introduction of the electronic control method, there are generated several advantages in that the efficiency thereof is high, the volume thereof is small, the weight thereof is light, and an added external control is easily executed.

A direct current(DC) power source applied to the conventional electronic ballast should be a regulated voltage source and, if a ripple voltage exists in the regulated voltage source, the light of lamp is flickered or is automatically turned off due to the negative resistance impedance characteristic of the lamp. Furthermore, the power source outputted to the lamp should be a current source. To this end, the regulated DC power source should be inverted into the lamp power. Therefore, the electronic ballast circuit is preferably comprised of a converter part and an inverter part. Various kinds of control methods in the converter part and the inverter part are suggested, and hereinafter, an explanation of the advantages and disadvantages thereon will be in detail discussed.

Converter Part 1) condenser input type control method: An alternating current(AC) line power of about 50 Hz or 60 Hz is full wave rectified, and to suppress a ripple factor in the full wave rectified power, a large capacity of condenser is installed. In the control method, however, an input power factor falls to a percentage of about 55%. Moreover, upon application of the initial power, an inrush current greatly flows. Accordingly, the control method is not adapted for a large capacity of electronic device, because of the above-mentioned problems.

2) choke input type control method: To solve the problem occurring in the condenser input type control method, a choke coil is inserted into the front end of the condenser. A ripple rate is variable in accordance with the current value, and to decrease the ripple rate, a large capacity of choke coil is necessary. However, the choke input type control method is not well adapted because the choke coil for improving the power factor should be designed in a large size.

3) chopper regulator type control method: This method is used to decrease the capacity of the choke coil by using a switching transistor. The method is classified into a step-down converter method and a step-up converter method. In the step-down converter method, a control voltage is lower than an input power, and contrarily, in the step-up converter method, the control voltage is higher than the input power. Accordingly, the method can arbitrarily adjust the control voltage by using both the step-down converter and the step-up converter. In the method, however, there occur the problems in that the power loss can not be avoided because of the installation of the switching transistor and noises are greatly generated due to a reverse recovery current of a flywheel diode, which is combined with the switching transistor.

Inverter Part

1) DC current source control method: In the high intensity discharge lamp, a mercury lamp contains mercury within the tube thereof, and does not form any material therein. A high pressure sodium vapor lamp or a metal halide lamp spreads a lighting color material over the electrode thereof or pastes a part of the tube with the material. If a DC current source is applied to the lamp, the two poles of the lamp have different temperatures from each other. In this case, there occurs no problem in lighting the mercury lamp, but there occurs the problem in that the sodium vapor lamp or the metal halide lamp can not emit a desired lighting color. As a result, for the application of the lamp power source, the regulated DC voltage source should be inverted into the alternating current source. Therefore, this method can be adapted only for the embodiment of the mercury lamp.

2) low frequency inverter type control method in a full bridge manner: A full bridge switching transistor inverts a frequency into a low frequency and controls an output in a chopper regulator type. And, the full bridge switching transistor generates a current source in the step-down circuit on the chopper regulator. If the full bridge switching transistor does not operate as the current source, theoretically the output current infinitely flows due to the negative resistance impedance characteristic of the lamp. The above method has the advantages of a good input power factor and a stabilized power control, but has the disadvantages of a low efficiency of about 84%, lots of noises and a large number of parts.

3) a high frequency inverter type control method: If the power of inverter part is the regulated DC power source, the method employs a series resonant inverter to thereby connect a series resonant condenser in parallel with the lamp. In the series resonant circuit, lighting of the lamp can be easily implemented since a series resonant inductance is operated as a current source. The power control of lamp is executed with a higher frequency than a resonant frequency. In a frequency adjustable control, the current or power of lamp is detected to thereby control the frequency of switching transistor. The above method has the advantage of a simple output circuit. On the other hand, there occurs a defect in that since the DC power source should be the regulated power source, the AC line power has to be applied to pass through the regulated voltage circuit. In addition, if the lamp is automatically turned off due to an unexpected accident during the lighting, the impedance of the series resonant circuit is greatly low to cause a great large amount of current to flow to the switching transistor, which results in the damage on the switching transistor.

OBJECTS OF THE INVENTION

An object of the present invention is to provide an electronic ballast for a high intensity discharge lamp which is capable of reducing the number of parts to thereby maintain a high power factor and prevent power loss generated in the circuit thereof.

SUMMARY OF THE INVENTION

To achieve this and other objects according to the present invention, there is provided an electronic ballast for a high intensity discharge lamp including: a converter part comprised of first to fourth rectifying diodes, each of the rectifying diodes which converts an input current into a DC current on which a ripple is loaded, and a choke coil and a first condenser for increasing a conduction angle of the input current; an inverter part comprised of first and second switching transistors to which a rectified DC current source is applied, a second condenser for supplying a charged voltage to a DIAC to turn on the DIAC, to thereby switch the second switching transistor, such that the conduction of the second switching transistor enables a free resonant signal to be excited to an output matching part, and first and second gate wave shaping integrated circuits to which the resonant signal detected by a gate transformer is applied, the first and second gate wave shaping ICs applying the applied signal to a gate of the first switching transistor to pass a controlled voltage in a gate protection Zener diode through a voltage source and a first current source, applying a positive gate voltage signal to gates thereof when a reflection signal voltage is increased and if the voltage is decreased, turning on a first transistor as potentials on the gates are higher than those on the gate transformer, to thereby decrease the gate potential to a negative gate potential to finally reach the potential of the voltage source, such that since the first and second switching transistors are synchronous with the reflection signal and are thus switched, the outputs therefrom are resonant and continually oscillated; the output matching part comprised of a resonant coil and first to third resonant condensers for calculating a time constant, and a transformer for establishing a winding rate to be matched with a tube voltage, to thereby return a reflection power generated when an output is not in a resonant state to an absorbed DC power source part; the absorbed DC power source part comprised of first and second diodes for inputting the reflection power generated from the output matching part, third and fourth condensers to which the inputted force is charged, to thereby reduce a ripple of a DC voltage, and third and fourth diodes for compensating the charged voltage to the third and fourth condensers through the first and second diodes in the state where the DC voltage is at a low level; a power control part comprised of a first operational amplifier for controlling a detected value from a first DC current detection resistor and second and third DC voltage detection resistors as a multiplied value in an output control integrated circuit and for controlling a second current source to control the current of the gate transformer, a first resistor on which the controlled current is outputted as a voltage, a second operational amplifier for operating the voltage with a reference voltage, a second resistor to which the operated value is outputted, a third resistor on which the outputted value is set as a power set value to input the power set to the first operational amplifier, a first comparator to which a detected value of a temperature sensor is inputted, a fourth resistor for setting a comparison value and for cutting an output of the first operational amplifier if the detected temperature is higher than the set value in the first comparator, a second comparator to which a detected value of a photo sensor is inputted, a fifth resistor for setting a comparison value and for cutting the output of the first operational amplifier if the detected external illuminance is higher than the set value in the second comparator, a first switch for removing the output cut of the first operational amplifier, a third comparator for comparing a value appearing at the time when the current value controlled in the second current source is changed to the voltage with a reference voltage and if a large amount of the current flows, for cutting the output of the first operational amplifier, a timer for cutting the output of the first operational amplifier if the lamp is not lighted within a desired relighting time period, a sixth resistor and a fifth condenser for determining a time constant for setting a time, and an undervoltage lockout for cutting the output of the first operational amplifier if a power source voltage is in short supply; and the gate transformer for detecting the resonant signal in the output matching part to thereby apply the detected signal to the first and second gate wave shaping integrated circuits.

BRIEF DESCRIPTION OF THE DRAWINGS

Other objects and aspects of the invention will become apparent from the following description of embodiments with reference to the accompanying drawing in which.

DETAILED DESCRIPTION OF THE PREFERRED EMBODIMENTS

Figure 1:
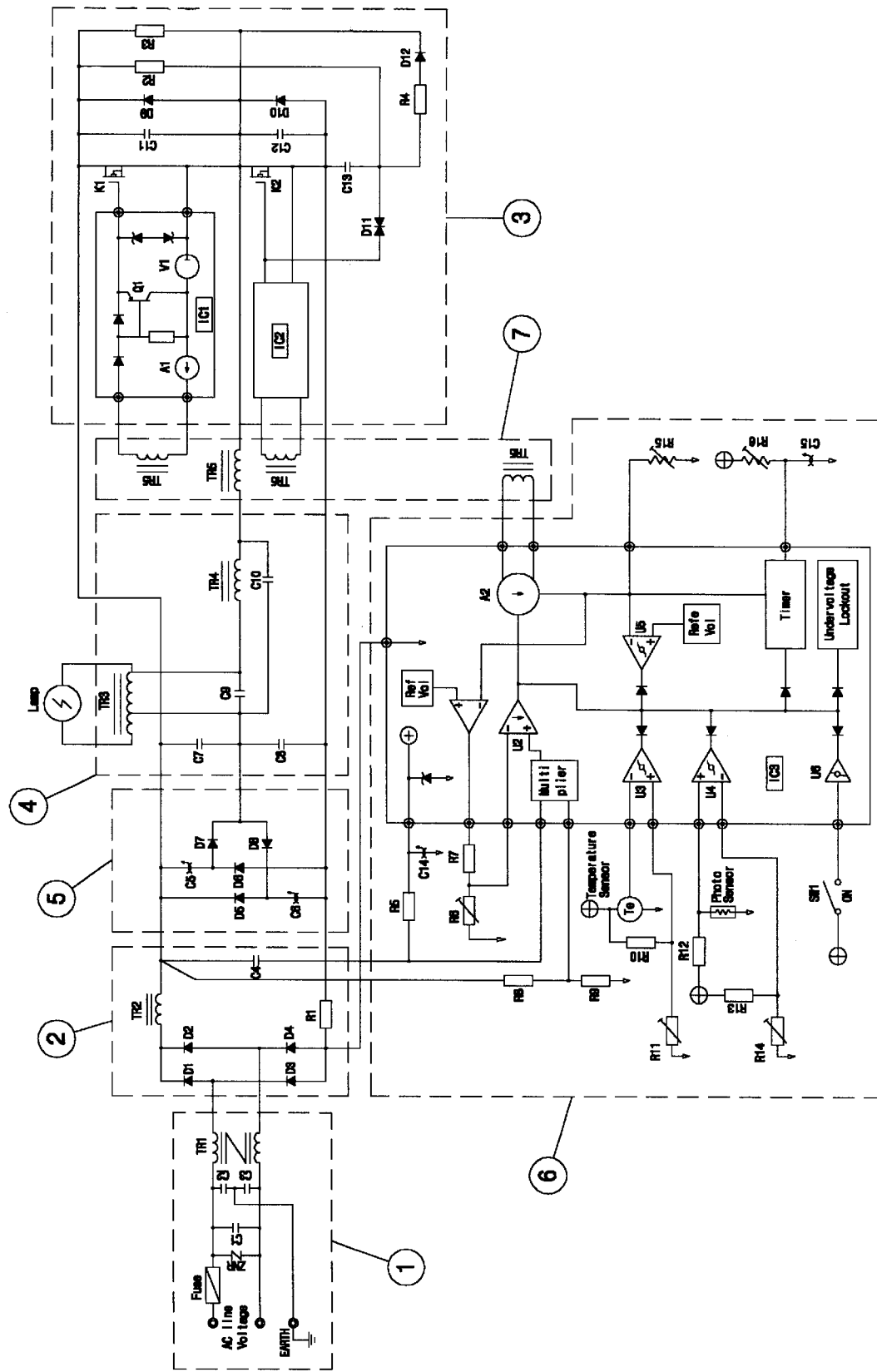
FIG. 1 is a circuit diagram illustrating an electronic ballast for a high intensity discharge constructed lamp according to a preferred embodiment of the present invention.

Hereinafter, an explanation on the construction and operation of an electronic ballast for a high intensity discharge lamp according to a preferred embodiment of the present invention will be discussed, but explanation on the well-known functions or constructions to those skilled in the art will be excluded in this detailed description for the sake of brevity.

In an electronic ballast for a high intensity discharge lamp according to the present invention, an AC line power is rectified to a DC power, but an additional constant power circuit is not employed. Instead a converter part 2 returns reflection power of an output to an absorbed DC power source part 5, to greatly reduce a ripple factor and maintain a power factor to be over about 94%. As a result, a minimum DC voltage is about ⅔ of a maximum DC voltage. Next, a series resonant half bridge inverter is adapted to invert the power of lamp into an alternating current. The series resonant half bridge inverter is constructed in a simple manner and requires a small number of parts. Even if the series resonant half bridge inverter has been developed, there still remains a problem in that the DC power should be inverted into a regulated voltage. That is, if the power of lamp is frequency-inverted into the DC power in which the ripple voltage is loaded, the inverted power is not abnormal at the time when the lighting of the lamp is initialized. If the tube voltage is increased, however, it is greatly increased at the ripple voltage due to the negative resistance impedance characteristic of the lamp. As a result, the flames of lamp may be flickered or the lamp may be automatically turned off. In the electronic ballast for a high intensity discharge lamp according to the present invention, a stable inverter part is provided even though the ripple voltage exists therein.

A gate transformer TR5 is provided to detect the series resonant current and then apply the detected current to gate wave shaping integrated circuits IC1 and IC2, in which the gate wave is suited to the gate rating of the switching transistors K1 and K2 to thereby reduce the switching loss therefrom. If the switching transistors are synchronous to the series resonant current and are thus switched, a tremendous amount of currents may flow from the switching transistors. Accordingly, the flowing of currents should be controlled. To this end, the voltage of the gate transformer TR5 is raised to be over the saturation voltage. The gate wave shaping integrated circuits IC1 and IC2 check the saturated point of the gate transformer TR5 to thereby convert the poles thereof. If the saturated voltage of the gate transformer TR5 is controlled, since the switching phase angle does not reach the resonance point and the poles of the switching transistors are inverted, a higher frequency than the resonance frequency is formed to limit the flowing of current to the switching transistors. The series resonant current is increased in accordance with a deviated degree from the resonance point. A power control part 6 serves to control the saturated voltage of the gate transformer TR5. With the power control part 6, the flowing of current is increased since the poles of the switching transistors are inverted at the portion which is adjacent to the resonance point on the low ripple voltage in the converter part, and is decreased since the poles thereof are inverted at the portion which is distant from the resonance point on the high ripple voltage therein. Accordingly, if a small amount of lamp current flows, the flames of lamp are flickered as the tube voltage is increased due to the negative resistance impedance of lamp. In the electronic ballast according to the present invention, however, such the flickering problem is never generated since a large amount of current flows to the low ripple voltage, In the power control part 6, an output control integrated circuit IC3 feeds back the DC power and the DC voltage and compares the fed back DC power and voltage according to a set value of a resistor R6, to thereby control the voltage of the gate transformer TR5. Since the voltage is controlled as a value multiplied by the power within the output control integrated circuit IC3, the lamps produce the same power even if the tube voltages of them are different from each other. In other words, even though the lamps have different types or various ratings of tube voltages, if they have the same power, they can be lighted with the same power. The inverted high frequency power is matched to an autotransformer of the output transformer TR3 and is then applied to the lamp. The output transformer TR3 serves to increase an initial lighting voltage and to render the tube current still remain within an output power control range even though the input voltage is varied.

For instance, a compared result of a leakage transformer type ballast with an electronic ballast according to the present invention (175 W) is given by the following Table <1>, and another compared result of National Co's electronic ballast in Japan with an electronic ballast according to the present invention (150 W) is given by the following Table <2>.

TABLE 1

Comparison of a leakage transformer type ballast with an electronic ballast according to the present invention (175W)

| No. | Specification | Leakage Transformer | Electronic Ballast | Reference |
|---|---|---|---|---|
| 1 | Input Power (W) | 210 | 180 | Input Voltage 220 V |
| 2 | Input Current (A) | 1 | 0.85 | |
| 3 | Efficiency (%) | 83 | 97 | |
| 4 | Power Factor (%) | 95 | 96 | |
| 5 | Relighting Current (A) | 2.5 | 0.2 or less | No-load current upon relighting after turning lighting off |
| 6 | Weight (kg) | 7.1 | 1 or less | |
| 7 | Volume (cm³) | 2500 | 750 | |
| 8 | DC Power Source | Non-use | Use | Vehicle battery use |
| 9 | Installation | Separately-Installed | Embedded | Interior of reflection panel |
| 10 | Output Variation Rate to Input Voltage (%) | 30 | 5 | Assumed that input voltage variation rate is 15% |
| 11 | Lamp Life Period | Short | Long | Determined whether lamp power is controlled |
| 12 | Flickering | Generated | Not generated | *Note 1 |

*Note 1 visual flickering phenomenon: an image for about ⅟₃₀ seconds remains as an afterimage in the retina of human body. In a general discharge lamp the light is turned on and off each ⅟₆₀ seconds. The eye of human body can not recognize the turning on and off of lamp, since the turning on and off time period of light is shorter than the afterimage forming period. However, movement of an object is recognized by several images. When the eye of human body observes the object, if the visual angle of human body is moved, his or her eye is flickered. For example, if he stands under a street lamp, he may be unstable, but if under an incandescent lamp, he may be good comfortable.

TABLE 2

Comparison of National Co's electronic ballast in Japan with an electronic ballast according to the present invention (150 W)

| No. | Feature | Proposed Electronic Ballast | National Co's Electronic Ballast | Reference |
|---|---|---|---|---|
| 1 | Input Power (W) | 156 | 178 | |
| 2 | Input Current (A) | 0.75 | 0.81 | Input Voltage 220 V |
| 3 | Efficiency (%) | 96 | 84 | |

TABLE 2-continued

Comparison of National Co's electronic ballast in Japan with an
electronic ballast according to the present invention (150 W)

| No. | Feature | Proposed Electronic Ballast | National Co's Electronic Ballast | Reference |
|---|---|---|---|---|
| 4 | Power Factor (%) | 94.5 | 97.7 | |
| 5 | Cost | 1.5 to 2 times | 10 times or more | Compared with transformer ballast |
| 6 | Flickering | Not generated | Generated | |

Now an operation of each circuit of the electronic ballast according to the present invention will be described.

In the input power supply part 1 the AC line power is noise-filtered and inputted to the converter part 2.

In the converter part 2 the input current from the input power supply part 1 is converted into a DC power in which the ripple is loaded by means of rectifying diodes D1 to D4. A choke coil TR2 and a condenser C4 serve to increase a conduction angle of the input current.

The rectified DC power is applied to switching transistors K1 and K2. At the time, a potential of a condenser C13 is charged and the charged potential turns on the diode D11, thus to turn on the switching transistor K2. As a result, the conduction of the switching transistor K2 enables a free resonant signal to be excited to the output matching part 4, and a gate transformer TR5 detects the resonant signal to apply the detected signal to the gate wave shaping integrated circuits IC1 and IC2.

The applied signal to the gate wave shaping ICs IC1 and IC2 is applied to a gate of the switching transistor K1 and thus a controlled voltage in a gate protection Zener diode passes through a voltage source V1 and a current source A1. A positive gate voltage signal is applied to the gate of the switching transistor K1 until a reflection signal voltage is increased and if the voltage is decreased, since the potential of the gate thereof is higher than that of transformer, a transistor Q1 is turned on, thus to decrease the gate potential up to a negative gate potential to finally reach the potential of the voltage source V1. As a result, since the switching transistors are synchronous with the reflection signal and are thus switched, the outputs therefrom are resonant and continually oscillated.

In the output matching part 4, a resonant coil TR4 and resonant condensers C7 to C9 are provided for setting a time constant, and the resonant frequency is calculated by the set time constant. The output transformer TR3 sets a winding rate to be matched with a tube voltage of the lamp. In this case, if the tube voltage is high, the winding rate is increased, and contrarily if low, the output transformer is removed. If the output is not at a resonant state, the reflection power is greatly generated from the output matching part 4, and the generated reflection power is returned to the absorbed DC power source part 5.

The absorbed DC power source part 5 charges the reflection power generated from the output matching part 4 to condensers C5 and C6 via the diodes D7 and D8. The charged voltage reduces the ripple of the DC voltage. The charged voltage to the condensers C5 and C6 is compensated through diodes D5 and D6 in the state where the DC voltage is at a low level.

In a power control part 6, an operational amplifier U2 multiplies the detected value from a DC current detection resistor R1 by the detected value from DC voltage detection resistors R8 and R9 in the output control integrated circuit IC3. The operational amplifier U2 controls a current source A2 to finally control the current of the gate transformer TR5. The controlled current is changed to a voltage on a resistor R15. The voltage on the resistor R15 is operated with a reference voltage in an operational amplifier U1, thus to output the operated result to a resistor R7. The outputted value is set as a power set value at a resistor R6 and is then inputted to the operational amplifier U2.

A detected value of a temperature sensor is inputted to a comparator U3, and a comparison value of the comparator U3 is set by a resistor R11. If the detected temperature is higher than the set value in the comparator U3, the output from the operational amplifier U2 is cut off.

A detected value of a photo sensor is inputted to a comparator U4, and a comparison value of the comparator U4 is set by a resistor R14. If an external light is brighter than the set value in the comparator U4, the output from the operational amplifier U2 is cut off.

If the signal of a switch SW1 is inputted, the output cut of the operational amplifier U2 is removed.

The current value controlled in the current source A2 is changed to the voltage at a resistor R15. The voltage value is compared with a reference voltage by a comparator U5, and if a large amount of the current flows, the output of the operational amplifier U2 is cut off.

Generally, a relighting time period is necessary to relight the lamp, when the lamp is turned off during the lighting of lamp. If the lamp is not lighted within a desired relighting time period, a timer cuts the output of the operational amplifier U2. A time constant for setting the desired relighting time period is determined by a resistor R16 and a condenser C15.

An undervoltage lockout cuts off the output of the operational amplifier U2, if a power source voltage is in short supply.

The power of output control integrated circuit IC3 is applied to a resistor R5.

An explanation of the above-mentioned parts within the circuit of the electronic ballast according to the present invention will be in detail given.

The AC line power is converted into the DC voltage by means of the diodes D1 to D4. The DC voltage is filtered by the transformer TR2 and the capacitor C4. The filtered DC voltage is high frequency alternate switched by means of the switching transistors K1 and K2. The high frequency power is resonated in the resonant transformer TR4 and the capacitors C7 to C9. The resonant power is outputted to the lamp via the output transformer TR3. The resonant signal is detected in the gate transformer TR5 and is supplied to the gate wave shaping integrated circuits IC1 and IC2 and the output control integrated circuit IC3. The gate wave shaping ICs IC1 and IC2 wave-shape the detected signal, and the output control IC IC3 synchronizes the resonant current to control the output of the gate transformer TR5. The resistors R2 and R3, the condenser C13 and the diode D11 serve as a device for generating an initial signal. The resistor R14 and the diode D12 remove the initial signal generation after lighting of the lamp. The condensers C5 and C6 and the diodes D5 to D8 in the absorbed DC power source part 5 reduce the reflection power of the output power to the DC power. The condensers C11 and C12 serve to suppress a voltage rise rate(dv/dt) of the switching transistors K1 and K2. The condensers C1 to C3 and the transformer TR1 in the input power supply part 1 serve to suppress generation of noise. A Zener diode ZNR serves to prevent a switching element from blowing if the input power is excessively applied. The resistor R1 detects the input current, and the resistors R8 and R9 detects the input voltage. The resistors R6 and R7 serve to set the output current and the temperature sensor functions as a heat sink temperature detecting sensor. The resistors R10 and R11 function to set a heat sink temperature. The photo sensor detects illuminance at the open air and if the detected illuminance is low, serves to light the lamp. The resistors R13 and R14 function to set the illuminance at the open air. The switch SW1 acts as a remote lighting switch, and the resistor R15 serves to detect the output current. The resistor R16 and the condenser C15 serve to set a relighting time period after the lamp is turned off.

Under the above construction, the electronic ballast for a high intensity discharge lamp according to the present invention has the following advantages when compared with the conventional electronic ballasts:

1) High efficiency of about 90% or more: The number of semiconductors through which current flows is limited by the installation of rectifying diodes D1 to D4 and the switching transistors K1 and K2, to thereby reduce the loss of semiconductor, Since an output current is a high frequency, all kinds of transformers are winded by a high frequency coil to prevent the resistance loss generated in a general winding due to a high frequency skin effect. When the condensers C11 and C12 turn off the switching transistors K1 and K2, they perform zero crossing switch off operation, such that no switching loss is generated. Further, the reflection power is returned to the absorbed DC power source part 5, to thereby reduce the peak currents of the switching transistors K1 and K2 (for instance, the electronic ballast according to the present invention has the efficiency of 95% when compared with the 175 W leakage transformer type ballast having the efficiency of 83%).

2) Volume of the electronic ballast according to the present invention is 0.3 times as large as that of the leakage transformer ballast; Since the output current is a high frequency, the volume of all transformers is reduced in proportion to the high frequency, and the size of the heat sink is relatively small (for example, the electronic ballast according to the present invention has the volume of 750 cm$^3$ when compared with the 175 W leakage transformer type ballast having the volume of 2500 cm$^3$).

3) Weight of the electronic ballast according to the present invention is 0.2 times as large as that of the leakage transformer ballast; Since the output current is the high frequency, the weight of all transformers is reduced in proportion to the high frequency, and the weight of the heat sink is relatively light (for example, the electronic ballast according to the present invention has the weight of 1 kg when compared with the 175 W leakage transformer type ballast having the weight of 7.1 kg). Therefore, installation of the electronic ballast in the reflection panel is possible and since a consumption power amount thereof is small, the sealing of the electronic ballast within the reflection panel has no influence on the temperature increment. In addition, the temperature sensor is embedded to be automatically cut off, when the heat source of lamp is delivered to the reflection panel, to thereby prevent fire generation.

4) A constant level of output current irrespective of the variation of input voltage; The output control integrated circuit IC3 detects the DC voltage and DC current to thereby control the power. For instance, in the case where the input voltage is varied within the range of ±10%, the output voltage of leakage transformer ballast is varied within the range of ±20%, but the output voltage of the electronic ballast according to the present invention is varied within the range of ±5%.

5) It is operable with DC power supply voltage; A general leakage transformer ballast is operated only with the AC line power of about 50 Hz or 60 Hz, but the electronic ballast according to the present invention is operated with the direct application of the DC power, since the alternating current is filtered to the direct current and the filtered DC is then converted into the high frequency current. Therefore, the electronic ballast according to the present invention is operated provided that vehicle power is applied and the winding rate of the transformer TR3 is changed.

6) No flickering is generated: As the high frequency power is applied to the lamp, no flickering phenomenon in the electronic ballast according to the present invention is generated.

7) Turning lamp on and off by an auxiliary switch without using an external power switch; In the leakage transformer ballast the lamp is turned on and off by the application and cut-off of power, but in the electronic ballast according to the present invention the lamp is turned on and off by the operation of the auxiliary switch SW1, since the power is always applied and the gate of switching transistor is cut off.

8) Flowing of input current is weak upon no-load; The high intensity discharge lamp has a high tube temperature and atmosphere if the power is at a normal state. Since the lamp heat is not dropped at a rapid speed after turned off, the tube atmosphere is high, and thus when the lamp is re-lighted, the initial lighting of lamp may fail. At the time, in the leakage transformer ballast the input current being twice as large as the rated current flows. In the electronic ballast according to the present invention, however, flowing of input current is greatly weak and unloading power is not found. For example, the 175 W leakage transformer type ballast has the no-load input current of 2.5 A, and the electronic ballast according to the present invention has the no-load input current of 0.2 A.

9) An initial lighting signal is eliminated when the lighting of lamp is impossible due to the destruction of lamp; In the case where lamp current does not flow due to the destruction of lamp, the condenser C15 and the resistor R16 serve to set a time to thereby cut the gate of the switching transistor. As a result, if the gate signal is cut, the tube voltage in the lamp is at a zero potential. Accordingly, upon the destruction of lamp, generation of a fire caused by a high voltage can be prevented.

10) Installation of temperature sensor: Generally, the temperature of indoor ceiling is high in summer. A conventional ballast does not install any temperature sensor to be exposed on a danger of fire generation, but the electronic ballast according to the present invention installs the temperature sensor and if a temperature is high, stops the operation of the sensor.

11) An initial current limit function; Upon initial lighting of lamp, the potential of lamp approximates zero potential. At the time, in the leakage transformer ballast the input current being twice as large as the rated current flows. However, in the electronic ballast according to the present invention the current is detected in the transformer TR5 and the tube current is limited to be 1.5 times as large as the rated current, to thereby prevent an excessive amount of heat from being generated.

In addition, since the electronic ballast according to the present invention is automatically turned on and off in accordance with the outside illuminance, it is very convenient to be used and further the turning the lamp on and off can be controlled in a remote control manner.

As apparent from the foregoing, a novel electronic ballast according to the present invention has the circuit construction in a simple manner and a high degree of efficiency as a high frequency power is outputted, when compared with the conventional leakage transformers or existing electronic ballasts. Moreover, the electronic ballast according to the present invention is constructed with a light weight and in a small size. With the above advantages, it is desirable that the cost of the electronic ballast according to the present invention is high by as much as twice that of the general ballast.

Although a preferred form of the invention has been described, it will be understood by those skilled in the field that variations therefrom, and analogous uses, are within the knowledge of those skilled in the art. Accordingly, it is intended that the scope of the invention be defined, not by the scope of the foregoing description, but rather by the scope of the claims as interpreted in view of the pertinent prior art.

What is claimed is:

1. An electronic ballast for a high intensity discharge lamp, comprising:

a converter part comprised of first to fourth rectifying diodes, each of said rectifying diodes converting an input current into a DC current on which a ripple is loaded, and a choke coil and a first condenser for increasing a conduction angle of the input current;

an inverter part comprised of first and second switching transistors to which a rectified DC current source is applied, a second condenser for supplying a charged voltage to a DIAC to turn on said DIAC, to thereby switch said second switching transistor, such that the conduction of said second switching transistor enables a free resonant signal to be excited to an output matching part, and first and second gate wave shaping integrated circuits to which the resonant signal detected by a gate transformer is applied, said first and second gate wave shaping ICs applying the applied signal to a gate of said first switching transistor to pass a controlled voltage in a gate protection Zener diode through a voltage source and a current source, applying a positive gate voltage signal to gates thereof when a reflection signal voltage is increased and if the voltage is decreased, turning on a first transistor as potentials on the gates are higher than those on the gate transformer, to thereby decrease the gate potential to a negative gate potential to finally reach the potential of the voltage source, such that since said first and second switching transistors are synchronous with the reflection signal and are thus switched, the outputs therefrom are resonant and continually oscillated;

said output matching part comprised of a resonant coil and first to third resonant condensers for calculating a time constant, and a transformer for establishing a winding rate to be matched with a tube voltage, to thereby return a reflection power generated when an output is not in a resonant state to an absorbed DC power source part;

said absorbed DC power source part comprised of first and second diodes for inputting the reflection power generated from said output matching part, third and fourth condensers to which the inputted force is charged, to thereby reduce a ripple of a DC voltage, and third and fourth diodes for compensating the charged voltage to said third and fourth condensers through said first and second diodes in the state where the DC voltage is at a low level;

a power control part comprised of a first operational amplifier for controlling a detected value from a first DC current detection resistor and a detected value from second and third DC voltage detection resistors as a multiplied value in an output control integrated circuit and for controlling a second current source to control the current of said gate transformer, a first resistor on which the controlled current is changed to a voltage, a second operational amplifier for operating the voltage with a reference voltage, a second resistor to which the operated value is outputted, a third resistor on which the outputted value is set as a power set value to input the power set to said first operational amplifier, a first comparator to which a detected value of a temperature sensor is inputted, a fourth resistor for setting a comparison value and for cutting an output of said first operational amplifier if the detected temperature is higher than the set value in said first comparator, a second comparator to which a detected value of a photo sensor is inputted, a fifth resistor for setting a comparison value and for cutting the output of said first operational amplifier if the detected external illuminance is higher than the set value in said second comparator, a first switch for removing the output cut of said first operational amplifier, a third comparator for comparing a value appearing at the time when the current value controlled in said second current source is changed to the voltage with a reference voltage and if a large amount of the current flows, for cutting the output of said first operational amplifier, a timer for cutting the output of said first operational amplifier if the lamp is not lighted within a desired relighting time period, a sixth resistor and a fifth condenser for determining a time constant for setting a time, and an undervoltage lockout for cutting the output of said first operational amplifier if a power source voltage is in short supply; and said gate transformer for detecting the resonant signal in said output matching part to thereby apply the detected signal to said first and second gate wave shaping integrated circuits.

* * * * *